Sept. 19, 1950 F. J. LOCHEN 2,522,624
FISHING ROD HANDLE
Filed May 1, 1946
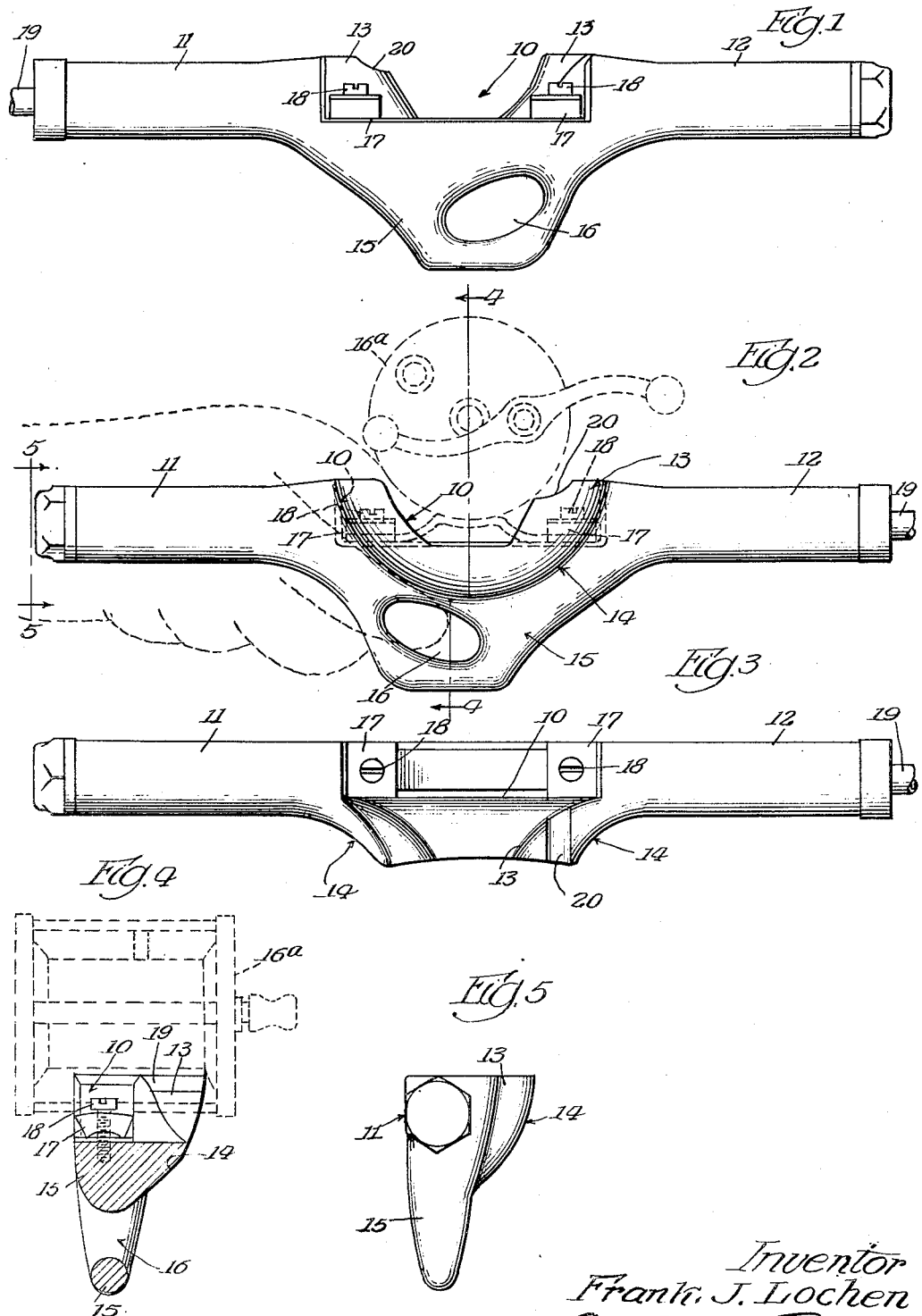
Inventor
Frank J. Lochen
By Patented Sept. 19, 1950

2,522,624

UNITED STATES PATENT OFFICE 2,522,624

FISHING ROD HANDLE

Frank J. Lochen, Chicago, Ill.

Application May 1, 1946, Serial No. 666,264

2 Claims. (Cl. 43—23)

1

This invention relates to fishing rod handles, and one of the objects of the invention is to provide, in a handle of this character, improved means to be engaged by the forefinger of the hand, and improved means which co-operates with the finger engaging portion, whereby the handle will not only be comfortably held, but means are provided, such as a flange or projection which conforms to, and is adapted to be engaged by the edge of the hand and the side of the forefinger, thereby insuring a firm grip and, at the same time, permitting the thumb to be free to control the operation of the reel, without releasing or easing the grip on the handle.

Another object is to provide a one-piece handle construction of this character, having a recess or seat for receiving and holding a reel.

A further object is to provide an improved handle of this character, which will be of a simple, durable and light construction, and efficient and effective in operation.

To the attainment of these ends, and the accomplishment of other new and useful objects as will appear, the invention consists in the features of novelty in substantially the construction, combination and arrangement of the several parts, hereinafter more fully described and claimed, and shown in the accompanying drawing, in which:

Fig. 1 is a side elevation of a handle of this character, constructed in accordance with the principles of this invention.

Fig. 2 is a view similar to Fig. 1, but from the other side of the handle, showing in dotted lines a reel in position, and also in dotted lines a hand, showing the manner of grasping the handle.

Fig. 3 is a top plan view of the handle.

Fig. 4 is a detail sectional view on line 4—4, Fig. 2.

Fig. 5 is an end view, taken along the line 5—5, Fig. 2.

The handle consists essentially of a body portion having a recess 10, arranged substantially at the longitudinal center thereof, to provide two end portions 11—12, of any suitable length and shape, and of any suitable cross-sectional diameter. Adjacent the recess 10, the body portion is enlarged or shaped to form a laterally projecting flange 13, the outer face of which is curved, as at 14, and is of a configuration to conform to the shape of the adjacent edge or side of the hand, so that the forefinger and adjacent portion of the hand will rest comfortably there-

2 against. This flange is of a length substantially co-extensive with the recess 10.

The body of the handle is also enlarged, as at 15, to form a projecting portion that is disposed at substantially right angles to the flange 13, and this enlargement or projection 15 is provided with a slot 16 extending transversely therethrough, for the reception of the forefinger. The slot may be of any desired size and shape convenient for the insertion and withdrawal of the forefinger, and is preferably arranged at a slightly inclined position with respect to the length of the handle.

The unitary fishing rod handle shown in the preferred embodiment of the drawing has the aligned and elongated grip and rod receiving portions 11 and 12 connected by an intermediate portion formed to provide a reel recess 10 of particular configuration. More specifically described, the transverse recess 10 is open at its sides and is formed to provide a reel seat between fastening devices 17, and a lateral enlargement 14 at one side only of the reel seat for intimate cooperation with the hand of the user. The enlargement 14 is given the special form of a convex flange of arcuate shape. Directly beneath the reel seat the handle includes the depending longitudinal enlargement 15 having the forefinger slot or aperture 16 extending therethrough and lying in a zone determined by the ends of the reel seat. As shown best in Figs. 3 and 4, it is preferable that the common sides of the handle portions 11 and 12 and the depending enlargement 15 be approximately contained in a common plane. It will be further observed that the meeting surfaces of lateral enlargement 14 and depending enlargement 15 blend smoothly and are shaped and arranged for conforming engagement with the side of the forefinger and the adjacent portion of the side of a hand when the forefinger is in the aperture 16 and the grip portion 11 is grasped as indicated in Fig. 2.

The reel 16ª, indicated in dotted lines, is seated in the recess 10, and the ends of the base of the reel are engaged by fastening devices 17, such as clips or the like, secured in position by fastening screws 18, in a manner well known in this art.

The fishing rod 19 is inserted into and secured in one end of the handle. A portion of the face of the flange 13 may be cut away or recessed, as at 20, to accommodate a projecting portion of the reel.

In use, the handle is grasped by the end 11, and the forefinger is inserted into the slot or opening 16, which will bring the side of the forefinger and the adjacent portion of the side of the hand in position to rest against the curved surface 14 of the flange 13. This will enable the user to firmly and securely grasp the handle, and the thumb will be left free to control the manipulation of the reel, without requiring the user to release his grip, and, at the same time, the handle will fit comfortably in the hand of the user, without the hand becoming tired or cramped from gripping the handle for any considerable length of time.

While the preferred form of the invention has been herein shown and described, it is to be understood that various changes may be made in the details of construction, and in the combination and arrangement of the several parts, within the scope of the claims, without departing from the spirit of this invention.

What is claimed as new is:

1. A unitary fishing rod handle having elongated hand grip and rod receiving portions connected to and spaced from each other by an intermediate portion having a transverse recess open at its sides and providing a reel seat, said intermediate portion being formed to provide an enlargement laterally located with respect to one side of said seat at one side only of the transverse recess and formed as a convex flange extending outwardly from the seat, of arcuate shape, and a depending enlargement extending lengthwise of the rod handle directly beneath the reel seat and having a forefinger aperture extending transversely therethrough and lying in entirety beneath the reel seat between the longitudinal ends thereof, the depending enlargement and the outer surface of the convex flange being shaped and arranged to blend smoothly with each other and the hand grip portion for conforming engagement with the sides of the forefinger and the adjacent portion of the side of the hand when the end of the forefinger is in said aperture and the hand grip portion is grasped by the palm of the same hand.

2. A unitary fishing rod handle having aligned and elongated grip and rod receiving portions connected to and spaced from each other by an intermediate portion having a transverse recess open at its sides providing a reel seat, said intermediate portion being formed to provide an enlargement laterally located with respect to one side of said seat at one side only of the transverse recess and formed as a convex flange extending outwardly from the seat and being of arcuate shape, and a depending enlargement extending lengthwise of the rod handle directly beneath the reel seat and having a forefinger aperture extending transversely therethrough and lying in entirety beneath the reel seat between the longitudinal ends thereof, the depending enlargement and the outer surface of the convex flange being shaped and arranged to blend smoothly with each other and the hand grip portion for conforming engagement with the side of the forefinger and the adjacent portion of the side of the hand when the end of the forefinger is in said aperture and the hand grip portion is grasped by the palm of the same hand, and the common sides of the grip and rod receiving portions and of the depending enlargement opposite said laterally located enlargement lying approximately in a common plane.

FRANK J. LOCHEN.

REFERENCES CITED

The following references are of record in the file of this patent:

UNITED STATES PATENTS

| Number | Name | Date |
| --- | --- | --- |
| D. 141,078 | Wheatley | May 1, 1945 |
| D. 150,951 | Hill | Sept. 14, 1948 |
| 1,572,104 | Budd | Feb. 9, 1926 |
| 2,116,158 | Pontis | May 3, 1938 |
| 2,158,396 | Birnstock | May 16, 1939 |
| 2,198,856 | Bowman | Apr. 30, 1940 |
| 2,226,897 | Cole | Dec. 31, 1940 |
| 2,402,882 | Garr | June 25, 1946 |